Oct. 21, 1930.  L. A. M. PHELAN  1,779,143
FUSIBLE SWITCH PLUG
Original Filed Oct. 7, 1925
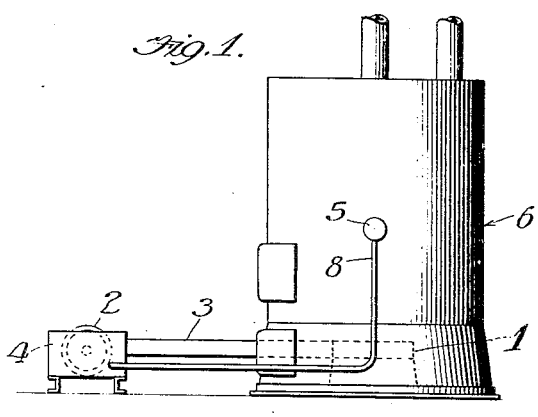
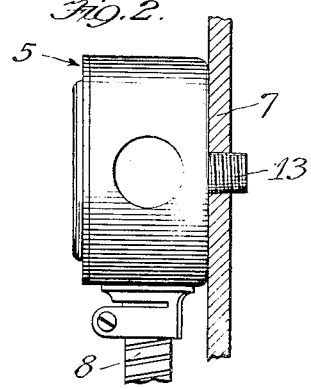
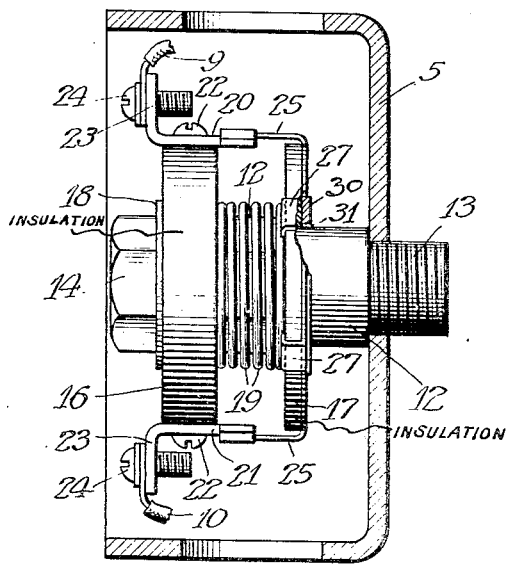
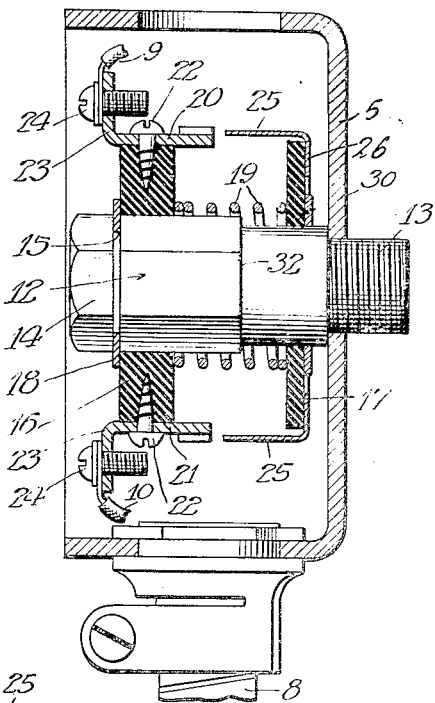
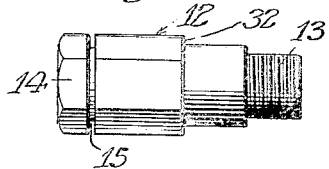
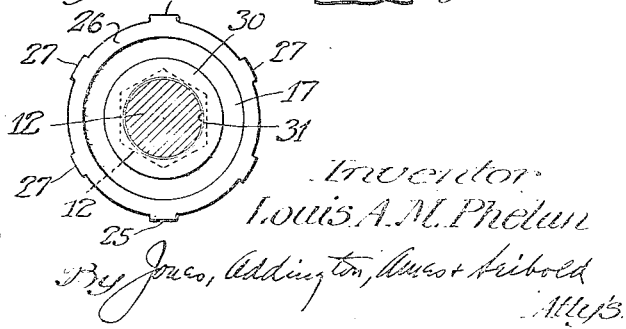
Inventor
Louis A. M. Phelan Patented Oct. 21, 1930

1,779,143

UNITED STATES PATENT OFFICE

LOUIS A. M. PHELAN, OF ELKHART, INDIANA, ASSIGNOR, BY MESNE ASSIGNMENTS, TO TIME-O-STAT CONTROLS COMPANY, OF ELKHART, INDIANA, A CORPORATION OF MARYLAND

FUSIBLE SWITCH PLUG

Original application filed October 7, 1925, Serial No. 60,939. Divided and this application filed April 11, 1927. Serial No. 182,553.

This application is a division of the application, Serial No. 60,939, filed October 7, 1925, by the applicant and relates to the subject-matter herein set forth and claimed. The aforementioned application related to a fusible switch plug, and the present continuing and divisional application filed by the present petitioner is limited to the invention claimed in claims 13 to 20, inclusive, of the aforementioned application.

This invention relates to fusible switch plugs and has special reference to fusible switch plugs for use as safety controls for automatic heating systems and the like.

In automatic heating systems, there is usually provided a motor for operating the fuel feeding device which may be in the form of a rotating distributor or motor blower ejecting the liquid fuel into the pot of the burner, according to the room temperature, the latter being controlled by the thermostat in one of the rooms of the building.

The type of furnace employed in connection with the burner quite often comprises a boiler, the water in which should be kept above a predetermined level to prevent damage to the heating plant. In the use of a boiler, it sometimes happens that a low water level is reached before the attendant is aware of it or that he is aware of it only after some serious damage is done to the plant, due to an overheated condition of the boiler. Inasmuch as the operation of the oil feeding means is controlled by the room thermostat, oil is continuously fed to the burner with no means for shutting off its flow when the water level lowers.

One of the objects of this invention, therefore, is to provide a cooperating structure, which, if for any reason the water in the boiler falls below the desired safety level, immediately checks the supply of oil and shuts down the heating plant until water is furnished to the boiler and the normal water level is again reached.

This invention contemplates the provision of a control of the motor circuit through a thermostat or fusible switch plug to provide for automatically governing the supply of fuel to the burner according to the water level in the boiler.

An improved type of fusible switch plug or thermostatically controlled circuit breaker is located adjacent to the side wall of the boiler so that one end of the plug may be threaded in the wall and cooled by the water. When the water level drops, the plug serves to transfer the heat to a fusible element which normally restores the movement of a contact carrying member. The transference of heat to the fusible element frees the element to permit the contact carrying member to open and break the motor circuit. By means of this control, it is possible to govern accurately and automatically the supply of fuel to the burner in accordance with the water level in the boiler.

Further objects and advantages of this invention will hereinafter be described and for a better understanding of the nature, scope and characteristic features of this invention, reference may be had to the accompanying drawings, in which:

Figure 1 illustrates the application of the invention to a furnace of any desired type;

Fig. 2 is an enlarged side elevational view of a conduit box housing the thermostatically controlled circuit breaker, embodying this invention;

Fig. 3 is an enlarged sectional view through the conduit box, illustrating the circuit breaker in side elevation;

Fig. 4 is a vertical sectional view of the device shown in Fig. 3;

Fig. 5 is a detailed view of a plug forming part of the circuit breaker; and

Fig. 6 is a detailed view of the plate carrying the movable contacts.

Referring now more particularly to the drawings, the fusible switch plug is applied to a furnace of a well known construction, which, for the purpose of the present description, may be briefly referred to as comprising a boiler of any proper type arranged over a burner pot 1 to which liquid fuel is fed by means of a motor 2 through a combustion flue 3. A housing 4 preferably containing a fan driven by motor 2 is connected to the opposite end of the combustion flue 3.

The liquid fuel may, however, be fed to the furnace by any well known means and other than that which is described and shown, and the motor may be located at any distance from the boiler. However, it is usually located in front of the furnace and arranged as part of a unit comprising the oil burner. A conduit housing 5 may be suitably secured to a wall 7 of a furnace 6, which wall 7 is the jacket wall of the boiler. A suitable conduit 8 is connected at the lower end of the conduit box 5 for receiving the wires 9 and 10. If it is desirable, both the wires 9 and 10 may be led through the conduit 8, or the wire 10 connecting to a room thermostat may be led out of the conduit box 5.

The mounting for the conduit box comprises a bolt 12 having one end reduced and threaded as indicated at 13. Bolt 12 may be formed of material of relatively high heat conductivity so that the threaded end 13 will be normally kept cool by the water in the boiler. The threaded end 13 preferably extends through the side wall 7 and the opposite end of bolt 12 is formed with a head 14 spaced from the remaining portion of the shank of the bolt by a peripheral groove 15. A spring washer 18 is placed in groove 15 and serves to hold one or two insulation plates 16 and 17, which serve as contact carrying members. Plates 16 and 17 are axially movable and mounted in concentric relation on bolt 12.

As illustrated in Figs. 3 and 4, the plate 16 is adapted to be held against spring washer 18 by means of a coil spring 19 surrounding the rear portion of the shank of the bolt 12.

A pair of diametrically opposed contacts 20 and 21 are fastened to the periphery of plate 16 by means of screws 22. These contacts are provided with a right angle bend 23 which are adapted to receive screws 24 for fastening the wires 9 and 10 thereto. The other end of contacts 20 and 21 are of channel formation and are adapted to receive the projecting ends of contact fingers 25. Plate 17 serves to carry these contact fingers 25. In this connection, it would be noted in Fig. 7 that it is preferable to form the contacts 25 on a ring 26, which latter is clamped to the plate 17 by means of the turned-over lugs 27. This would seem to be a very inexpensive way of securing the contacts 25 to the disc 17.

Normally, the coil spring 19 acts to move the plate 17 away from plate 16 and separate the contacts 25 from the stationary contacts 20 and 21. This movement is restrained, however, by a disc 30 fusibly connected at 31 to the plug 12. This fusible connection is sufficient to overcome the force of the spring, when the bolt or plug is kept cool or at a substantially low level by the water in the boiler. When the water level lowers below the point at which the bolt enters wall 7, the temperature immediately rises and the heat is transferred through the threaded reduced end 13. The bolt or plug readily conducts the heat and causes the fusible connection 31 to melt and to release the disc 30. Plate 17, which has been held against shoulder 32, is then forced away from plate 17 by the coil spring 19. The motor circuit is immediately broken and the operation of the motor is discontinued to shut off the supply of fuel oil to fire pot 1.

The action of the circuit breaker is instantaneous in that the heat is quickly transferred to melt the fusible connection when the temperature rises. The quick movement of plate 17 results from the action of the spring 19 tending to support both plates so that the circuit may be quickly broken. The contacts 25 are of a resilient nature and their ends are bent slightly downwardly in the direction of the channel ends of the contacts 20 and 21 in order to make good contact therewith when they are in circuit closing position.

It will be observed that a very compactly arranged and inexpensive thermostatically controlled circuit breaker has been disclosed herein. The thermally controlled disc 30 is advantageously disposed on bolt 12 and is subject to the direct heat of the interior of the boiler. The end 13 of bolt 12 will project a distance inwardly of the boiler so as to insure its continuous submersion as long as the normal water level is above the bolt.

It is preferable, however, to so dispose the circuit breaker that the end 13 of the bolt is in close proximity to a point within the boiler that is subjected to flame or heat intensity if a low water level occurs.

While but a single embodiment of this invention is herein shown and described, it is to be understood that the device is not to be limited to that specific structure since various modifications may be apparent to those skilled in the art without departing from the spirit and scope of this invention, and therefore, the same is to be limited only by the scope of the appended claims and prior art.

I claim:

1. A thermally controlled circuit breaker comprising a plug of high heat conductivity for direct engagement with a heat radiating device, an insulation collar held in a fixed relation to said plug, a second insulation collar mounted on and adapted to move axially along said plug, cooperating switch members mounted on said collars, spring means interposed between said collars and tending to disengage them, and a fusible element normally restraining axial movement of said second collar whereby the cooperating switch members are held in contact with each other only as long as said fusible element remains intact.

2. A thermally controlled circuit breaker comprising a plug of high heat conductivity for direct engagement with a heat radiating device, an insulation collar held in a fixed relation to said plug, a second insulation collar mounted on and adapted to move axially along said plug, a fusible member in close thermal relation to said plug and normally holding said second collar in fixed position thereon, cooperating switch members mounted on said collars, and means interposed between said collars and acting against said second collar to disengage said switch members when the fusible member becomes heated abnormally.

3. A thermally controlled circuit breaker comprising a plug of high heat conductivity for direct engagement with a heat radiating device, a washer exteriorly removable from said plug, an insulation collar adjacent said washer and mounted on said plug, a second insulation collar mounted on and movable along said plug, cooperating switch members mounted on said collar members, a compression spring between said collars to disengage said switch members and to hold said first collar against said washer, and a thermally controlled element normally restraining the movement to disengage said switch members.

In witness whereof, I have hereunto subscribed my name.

LOUIS A. M. PHELAN.